United States Patent

[11] 3,587,800

| [72] | Inventor | Bobby D. Crawford<br>Arlington, Tex. |
|---|---|---|
| [21] | Appl. No. | 788,291 |
| [22] | Filed | Dec. 31, 1968 |
| [45] | Patented | June 28, 1971 |
| [73] | Assignee | Fan Clutch Inc.<br>Dallas, Tex. |

[54] CLUTCH FOR AN AUTOMOBILE FAN
8 Claims, 3 Drawing Figs.

[52] U.S. Cl. ............................................. 192/58,
29/512, 285/382.4, 287/20.3
[51] Int. Cl. ........................................... F16d 35/00,
F16b 17/00
[50] Field of Search ........................................ 192/58, 58
(A-2); 192/58 (A-1); 29/512, 243.54; 285/382.4;
287/20.3

[56] References Cited
UNITED STATES PATENTS

| 362,274 | 5/1887 | Hall | 287/20.3(UX) |
| 3,094,881 | 6/1963 | Schultz, Jr. | 29/512(UX) |
| 3,259,221 | 7/1966 | Godfrey | 192/58(A-1) |
| 3,272,292 | 9/1966 | Sutaruk | 192/58(A-1) |
| 3,339,689 | 9/1967 | Sutaruk | 192/58(A-1) |
| 3,403,764 | 10/1968 | Sutaruk | 192/58(A-1) |
| 3,432,925 | 3/1969 | Woolley | 29/243.54(X) |

*Primary Examiner*—Allan D. Herrmann
*Attorney*—Richards, Harris & Hubbard

ABSTRACT: The disclosure is directed to a fluid drive coupling for use with the cooling fan of an automobile. A housing having opposed interior faces defining a fluid-retaining chamber is connected to the fan of an automobile. A rotatable drive plate is disposed within the chamber, with fluid being provided within the chamber for fluid coupling the drive plate to the opposed interior faces of the chamber. The drive plate has a central opening therethrough, with opposed beveled surfaces defined about the edges of the central opening. A shaft is rotatably mounted within the housing and extends through the circular opening in the drive plate. The end of the shaft has edges which are bent over the beveled surfaces of the drive plate to provide a rigid connection with the drive plate.

PATENTED JUN28 1971 3,587,800

INVENTOR
BOBBY D. CRAWFORD

Richards, Harris & Hubbard
ATTORNEY 3,587,800

CLUTCH FOR AN AUTOMOBILE FAN

FIELD OF THE INVENTION

This invention relates to fluid coupling structure, and more particularly to a fluid drive coupling for use with the cooling fan of an automobile or the like.

THE PRIOR ART

A number of devices have been heretofore developed for providing nonslip fluid coupling between an automobile engine and a cooling fan at low engine speeds, while providing a slipping fluid coupling between the engine and the fan at high engine speed in order to save engine horsepower. In such fluid coupling devices, a shaft rotated by the automobile engine has generally been rotatably extended through a fluid-retaining housing attached to the fan. The shaft is rigidly connected at the end thereof to a drive plate within the housing, fluid coupling being provided between the drive plate and the interior of the fluid-retaining housing. Examples of such devices are disclosed in U.S. Pat. No. 2,963,135 issued to T. J. Weir on Dec. 6, 1960; U.S. Pat. No. 3,059,745 issued to M. J. Tauschek on Oct. 23, 1962; and U.S. Pat. No. Re. 25,481 issued to T. J. Weir on Nov. 12, 1963.

It is important in such devices to provide a rigid connection between the shaft and the drive plate which is relatively simple to construct, but which remains secure throughout the high-speed use of the device. Heretofore, fluid drive couplers have utilized various connection means including threaded bolts, snap ring connectors and splined connections. Such previously developed shaft connections have not however been completely satisfactory with respect to ease of manufacture and have sometimes allowed play between the rotating parts.

SUMMARY OF THE INVENTION

In accordance with the present invention, a drive coupling for use with a cooling fan includes a housing having opposed interior faces which define a fluid-retaining chamber. A rotatable drive plate is disposed within the chamber and is adapted to be fluid coupled to the opposed faces of the chamber. The drive plate has a central opening therethrough with opposed beveled surfaces defined about the forward edge of the central opening. A shaft is rotatably mounted within the housing and extends through the circular opening in the drive plate. The end of the shaft has edges which are bent over the beveled surfaces in order to provide a rigid connection to the drive plate.

THE DRAWINGS

For a more complete understanding of the present invention and for further objects and advantages thereof, reference is now made to the following description taken in conjunction with the accompanying drawings, in which.

Figure 1:
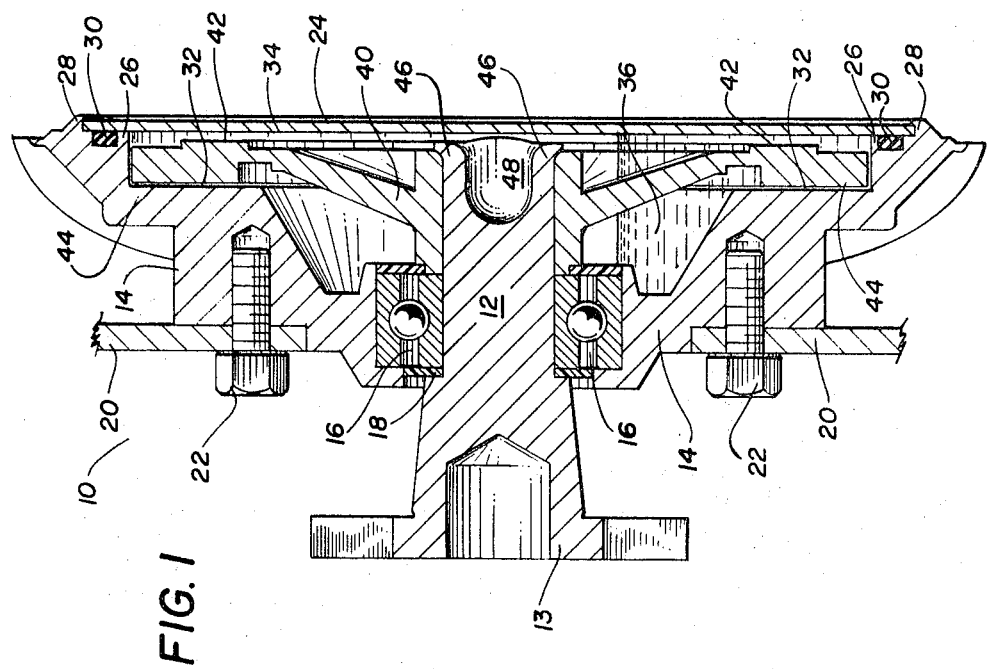
FIG. 1 is a sectional view of the assembled drive coupler of the invention.

Referring to FIG. 1, the drive coupler of the invention is designated generally by the numeral 10. Coupler 10 comprises a driving shaft 12 which is energized by the engine of an automobile or the like by a suitable pulley (not shown) which is attached to a flange 13. A generally cup-shaped housing 14 is mounted on bearing structure 16 for free rotation about the shaft 12. The shaft 12 includes an annular shoulder 18 which abuts with one side of the bearing structure 16 to prevent axial movement of the shaft 12 in the forward direction. Fan blades 20 are connected to the housing 14 by bolts 22. The fan blades 20 are rotated with the housing 14 to provide cooling to the engine in the well-known manner.

A circular cover plate 24 abuts an annular lip portion 26 of the housing 14 and is held in place by rolled edge portions 28. An O-ring 30 is compressed by the plate 24 to provide fluid-tight sealing between the housing 14 and the plate 24. An interior face 32 of the housing 14, in connection with the interior face 34 of the plate 24, forms a chamber for receiving a quantity of fluid designated generally by the numeral 36. The fluid 36 may comprise, for instance, silicone (e.g. Dow Corning, about 8000 centistokes).

A drive plate 40 encircles the shaft 12 and includes an annular ring projection 42 and a rearwardly extending annular projection 44. In a preferred embodiment, the space between the face of the ring projection 42 and the face 34 of the plate 24 is within the range of about 0.064 to 0.075 inch. The space between the face of the annular projection 44 and the interior face 32 of the housing 14 is much smaller, and in the preferred embodiment is within the range of about 0.015 to 0.020 inch.

The drive plate 40 abuts one side of the bearing structure 16 and is retained on the shaft 12 by radially outwardly turned lips 46 of the shaft. A cavity 48 is defined in the end of the shaft 12 to provide relatively thin wall portions to facilitate the deformation of the lips 46 over the drive plate 40 in the manner to be subsequently described.

Figure 2:
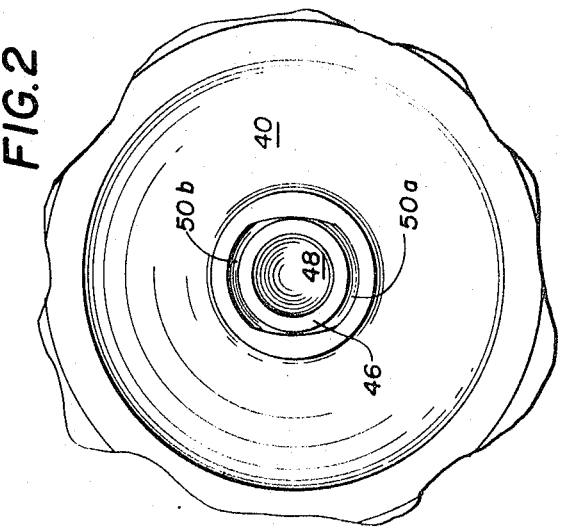
FIG. 2 is a front view of the drive plate of the coupler before connection of the shaft thereto.

FIG. 2 illustrates a front view of the drive plate 40 before the deformation of the lips 46 of the shaft 12. It will be seen that a pair of opposed beveled portions 50a-b are defined in the edge of the central aperture passing through the drive plate 40. In the initial step of manufacture of the present drive coupler, the shaft 12 is inserted through the central aperture of the drive plate 40 to the position shown in FIG. 2.

Figure 3:
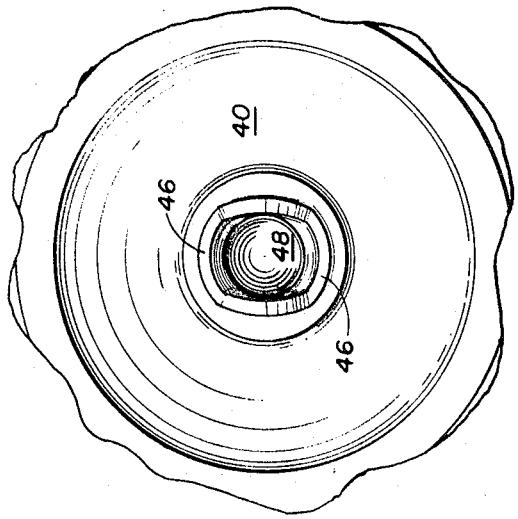
FIG. 3 is a front view of the drive plate after attachment of the shaft.

As best shown in FIG. 3, in the next step of manufacture, the lips 46 are bent into contact with the beveled surfaces 50a-b. The lips 46 are thus deformed into a generally egg-shaped or oval configuration. The abutment of the lips 46 with the beveled surfaces 50a-b prevents relative rotation between the shaft 12 and the drive plate 40 and insures a trouble-free, rigid connection therebetween, without necessity of additional connecting springs or bolts.

In operation of the present drive coupling system, the fluid 36 is evenly distributed throughout the interior of the housing 14 by centrifugal force when the shaft 12 is rotated by the engine. At relatively low engine speeds, an essentially nonslip coupling is provided by the fluid 36 to the drive plate 40 and the interior walls of the fluid-retaining chamber. At higher speeds, the fluid 36 allows slipping to occur between the drive plate 40 and the housing 14 in order to conserve engine horsepower.

Whereas the present invention has been described with respect to a specific embodiment thereof, it will be understood that modifications and changes will be suggested to one skilled in the art, and it is intended to encompass such modifications and changes as fall within the true scope of the appended claims.

I claim:

1. A drive coupling for use with a cooling fan comprising:
    a housing having opposed interior faces defining a fluid-retaining chamber,
    a rotatable drive plate disposed within said chamber for being fluid coupled to said opposed faces, said drive plate having a central opening therethrough including radially outwardly beveled portions formed in the drive plate at spaced points around the forward edge of said central opening,
    a shaft rotatably extending through said housing and through said circular opening in said drive plate, the end of said shaft having radially outwardly turned lips which are bent over into said beveled portions of said drive plate to provide a rigid connection that prevents both relative axial motion and relative rotary motion between said shaft and said drive plate, said end having a cavity therein to provide relatively thin wall portions to facilitate the deformation of said lips.

2. The drive coupling of claim 1 wherein said shaft is mounted in bearing means, said shaft including a shoulder for abutment with said bearing means to prevent axial movement of said shaft in one direction.

3. The drive coupling of claim 1 and further comprising:
a pair of opposed beveled portions, said edges of said shaft being bent over said portions to form a generally oval configuration.

4. The drive coupling of claim 1 wherein the space between said drive plate and the rearward interior face of said housing is much smaller than the space between said drive plate and the forward interior face of said housing.

5. The drive coupling of claim 1 wherein said housing comprises:
an annular generally cup-shaped member having a central opening therethrough for reception of said shaft, and
a circular plate sealingly connected across said cup-shaped member in a fluidtight relationship.

6. The drive coupling of claim 5 and further comprising:
O-ring means disposed between said cup-shaped member and said plate, edge portions of said cup-shaped member rolled radially inwardly to retain said plate against said O-ring means.

7. The drive coupling of claim 5 and further comprising:
bearing means connected within said central opening about said shaft.

8. The drive coupling of claim 7 wherein said shaft includes a shoulder which abuts one side of said bearing means, said drive plate abutting an opposite side of said bearing means.